US008741974B2

(12) United States Patent
Yoo et al.

(10) Patent No.: US 8,741,974 B2
(45) Date of Patent: Jun. 3, 2014

(54) METHOD OF FORMING FILTER IN FLUID FLOW PATH IN MICROFLUIDIC DEVICE

(75) Inventors: Chang-eun Yoo, Seoul (KR); Jong-myeon Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1229 days.

(21) Appl. No.: 12/141,205

(22) Filed: Jun. 18, 2008

(65) Prior Publication Data

US 2009/0176899 A1 Jul. 9, 2009

(30) Foreign Application Priority Data

Jan. 7, 2008 (KR) ........................ 10-2008-0001822

(51) Int. Cl.
*C08J 9/00* (2006.01)
*B01L 3/00* (2006.01)

(52) U.S. Cl.
CPC ................................ *B01L 3/502707* (2013.01)
USPC ............... 521/63; 521/64; 521/142; 521/146; 521/150; 210/500.27; 210/500.34; 210/500.35; 210/500.42; 210/500.43; 210/504; 210/634; 422/69; 422/70

(58) Field of Classification Search
USPC ........... 422/99-101, 69, 70; 210/634, 500.27, 210/500, 34, 500.35, 500.42, 500.43, 504; 521/63, 64, 142, 146, 150
See application file for complete search history.

(56) References Cited

U.S. PATENT DOCUMENTS

| | | | | |
|---|---|---|---|---|
| 6,811,695 B2 | 11/2004 | Karp | | |
| 6,852,851 B1 | 2/2005 | Tooke et al. | | |
| 6,884,395 B2 | 4/2005 | Tooke et al. | | |
| 6,887,384 B1 * | 5/2005 | Frechet et al. | ................ | 210/634 |
| 7,022,381 B2 * | 4/2006 | Kirby et al. | .................. | 427/487 |
| 7,279,134 B2 | 10/2007 | Chan et al. | | |
| 2002/0153251 A1 | 10/2002 | Sassi et al. | | |
| 2004/0101442 A1 | 5/2004 | Frechet et al. | | |
| 2006/0073484 A1 | 4/2006 | Mathies et al. | | |

FOREIGN PATENT DOCUMENTS

| | | |
|---|---|---|
| KR | 10-2006-0058527 A | 5/2006 |
| KR | 10-2006-0084737 A | 7/2006 |
| WO | 97/21090 A1 | 6/1997 |

OTHER PUBLICATIONS

Stachowiak T. et al., "Chip Electrochromatography", Journal of Chromatography, Jul. 2004, pp. 97-111, vol. 1044, No. 1-2, XP004522964, Elsevier Science Publishers B.V., Amsterdam, NL.

Liu J. et al., "Monolithic Column Plastic Microfluidic Device for Peptide Analysis Using Electrospray from a Channel Opening on the Edge of the Device", International Journal of Mass Spectrometry, Nov. 2006, pp. 65-72, vol. 259, No. 1-3, XP005762335, Elsevier Science Publishers, Amsterdam, NL.

* cited by examiner

*Primary Examiner* — Irina S Zemel
(74) *Attorney, Agent, or Firm* — Sughrue Mion, PLLC

(57) ABSTRACT

A method for forming a filter in a fluid flow path in a microfluidic device is provided. The method includes introducing a photopolymerization reaction solution into the microfluidic device; and performing polymerization of photopolymerization reaction solution to form a filter in the fluid flow path in a microfluidic device.

15 Claims, 1 Drawing Sheet

METHOD OF FORMING FILTER IN FLUID FLOW PATH IN MICROFLUIDIC DEVICE

CROSS-REFERENCE TO RELATED PATENT APPLICATION

This application claims the benefit of Korean Patent Application No. 10-2008-0001822, filed on Jan. 7, 2008, in the Korean Intellectual Property Office, the disclosure of which is incorporated herein in its entirety by reference.

BACKGROUND OF THE INVENTION

1. Field of the Invention

The present invention relates to a method for forming a filter in a fluid flow path in a microfluidic device.

2. Description of the Related Art

Microfluidic devices, e.g., compact disc (CD)- or microchip-type microfluidic devices, are often used in biological analysis. In the biological analysis employing a microfluidic device, spherical particles or beads are widely used for performing various functions in the analysis of a biological sample, such as cells, proteins, nucleic acids, or the like. It is necessary to isolate the beads, once used, from a sample solution. In order to isolate the bead, centrifugation or filtration may be employed.

Meanwhile, it is quite difficult to form a filter, i.e., a porous substance for performing desired filtering, in a microfluidic device because a microchannel generally has a small dimension, for example, of 500 μm or less. That is to say, it is difficult to accomplish inserting a filter into a microchannel of such a small dimension. Furthermore, it is difficult to insert a filter into an appropriate location of a microchannel. It is also difficult to hermetically seal a filter inserted into a microchannel.

U.S. Pat. No. 6,811,695 discloses a microfluidic device incorporating a filter element, the microfluidic device comprising: a first substantially planar device layer defining a microfluidic inlet channel; a second substantially planar device layer defining a microfluidic outlet channel, the outlet channel, having a first height; a third device layer disposed between the first device layer and the second device layer, the third device layer defining an aperture disposed between the inlet channel and the outlet channel, the aperture having a first width; and a filter element having a second height and a second width, the filter element being disposed substantially within the microfluidic outlet channel adjacent to the aperture; wherein the second height is greater than the first height, the second width is greater than the first width, and the filter element is compressively retained between the second device layer and the third device layer. U.S. Pat. No. 6,852,851 discloses a method of isolating DNA or cell nuclei or a mixture thereof from cells, which method comprises: a) treating a suspension of whole cells with a lysis reagent so as to lyse the cytoplasmic membranes and at least some of the nuclear membranes; b) introducing the resultant lysate from step a) into micro-channels of a microfabricated apparatus wherein each of said micro-channels incorporates means to impede the passage or flow of DNA and cell nuclei while allowing the passage of liquid through the micro-channel whereby a mesh comprising DNA is formed in the channel; and, c) washing the mesh comprising DNA. U.S. Pat. No. 7,279,134 discloses a microfluidic device, comprising a substrate platform comprising a plurality of cascading microfluidic channels including respective pairs of upper and lower microfluidic channels; and a plurality of porous membranes, each disposed between end portions of a respective pair of upper and lower microfluidic channels and comprising a semi-permeable barrier having a plurality of pores to selectively filter an influent fluid that may be introduced in an upper microfluidic channel on an input side thereof to produce a filtered effluent fluid in the lower microfluidic channel on an output side thereof.

Despite these and other attempts, still further methods for efficiently forming a porous membrane, i.e., a filter, in a microfluidic device, is desired.

SUMMARY OF THE INVENTION

The present invention provides a method for efficiently forming a porous membrane, i.e., a filter, in a microfluidic device.

In one embodiment of the present invention, there is provided a method for forming a filter in a fluid flow path in a microfluidic device, the method including providing a photopolymerization reaction solution comprising a photopolymerizable monomer, a crosslinker, a photopolymerization initiator, and a porogen; introducing the photopolymerization reaction solution into the fluid flow path of the microfluidic device; and performing a polymerization reaction of the photopolymerization reaction solution to form the filter in the fluid flow path in a microfluidic device.

According to another exemplary embodiment of the present invention, there is provided a method for forming a filter in a fluid flow path in a microdevice, the method including injecting a photopolymerization reaction solution into a microfluidic device through a photopolymerization reaction solution inlet formed at a fluid flow path in the microfluidic device, the photopolymerization reaction solution containing a photopolymerizable monomer, a crosslinker, a photopolymerization initiator, and a porogen; and exposing the photopolymerization reaction solution to UV radiation to synthesize a porous polymer thereby to form a filter in the fluid flow path in a microfluidic device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
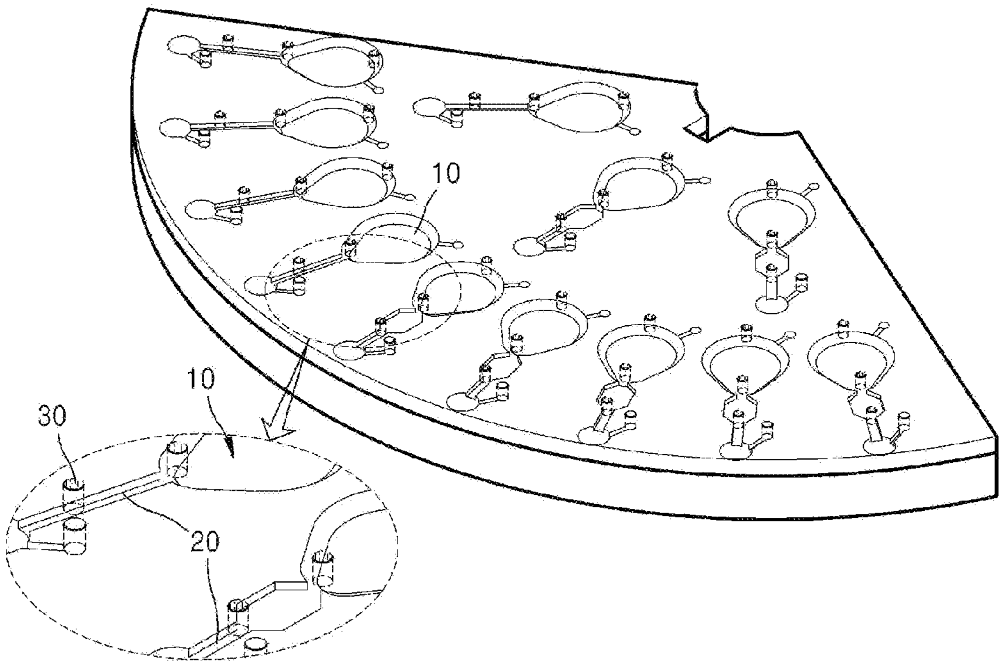
FIG. 1 illustrates a part of a fabricated microfluidic CD.

As used herein, the term "microfluidic device" incorporates the concept of a microfluidic device that contains microfluidic elements such as, e.g., microfluidic channels (also called microchannels or microscale channels). As used herein, the term "microfluidic" refers to a device component, e.g., chamber, channel, reservoir, or the like, that includes at least one cross-sectional dimension, such as depth, width, length, diameter, etc. of from about 0.1 micrometer to about 3000 micrometer. Thus, the term "microchamber" and "microchannel" refer to a channel and a chamber that includes at least one cross-sectional dimension, such as depth, width, and diameter of from about 0.1 micrometer to about 3000 micrometer, respectively. The microfluidic device may be shaped of a rotatable disk (to be referred to as a CD type, hereinbelow). International Application Publication No. WO97/21090 discloses a microfluidic device comprising sample inlet ports, fluid microchannels, reaction chambers, and sample outlet ports, the content of which is incorporated herein by reference in its entirety.

The method of the present invention includes introducing a photopolymerization reaction solution into a microfluidic device through a photopolymerization reaction solution inlet formed at a fluid flow path in the microfluidic device, the photopolymerization reaction fluid containing a photopolymerizable monomer, a crosslinker, a photopolymerization initiator, and a porogen.

In one embodiment, the photopolymerizable monomer may be any monomer that is polymerized through a photopolymerization reaction. The monomer may be a vinyl monomer. The vinyl monomer may be a $C_1$-$C_{20}$ alkyl acrylate, a $C_1$-$C_{20}$ alkyl methacrylate, and a styrene.

The crosslinker may be an aliphatic or aromatic crosslinking agent. The aliphatic crosslinker may be a homopolymer or copolymer of a $C_1$-$C_{20}$ alkyl acrylate, a $C_1$-$C_{20}$ alkyl methacrylate and a styrene. Further examples of the aliphatic crosslinker include, but are not limited to, a homopolymer of copolymer of monomers including an ethylene glycol dimethacrylate, an ethylene glycol diacrylate, a tri-methylol propane diacrylate, a tri-methylol propane triacrylate, a tri-methylol propane dimethacrylate, a tri-methylol propane tri-methacrylate, a divinylketone, an arylacrylate, a diallyl maleate, a diallyl fumarate, a diallyl succinate, a diallyl carbonate, a diallyl malonate, a diallyl oxalate, a diallyl adipate, a diallyl sebacate, a divinyl sebacate, a N,N'-methylenediacrylamide, and a N,N'-methylenedimethacrylamide. In an embodiment, the crosslinker may be a homopolymer or copolymer of 2-20 monomers.

The aromatic crosslinker may be a divinylbenzene, a trivinylbenzene, a divinyltoluene, a divinylnaphthalene, a diallylphthalate, a divinylxylene, and a divinylethylbenzene.

In the method of the present invention, any known radical polymerization initiator in the field can be used as the initiator. Examples of the initiator include, but are not limited to, azobisisobutyronitrile (AIBN), 1,1'-Azobis(cyclohexanecarbonitrile (ABCN), benzophenone, 2,2-dimethoxy-2-phenylacetophenone, and benzoyl peroxide.

In the method of the present invention, the porogen may be selected from hydrocarbons having at least 6 carbons, for example, C6~C12 carbons, and aliphatic alcohols, for example, C6~C12 aliphatic alcohols.

The fluid flow path in the microfluidic device having the filter formed therein is made of a material selected from a metal, silicon, plastic, and a polymer, and includes a functional group on the surface thereof allowing the filter to be bonded to and immobilized on the surface of the fluid flow path, for example on the surface of microchannel. Herein, the surface intends to mean a region where a fluid flowing in the fluid flow path contacts thereto. The functional group may be a group that naturally occurs or is induced by, for example, functionalization, to produce a vinyl functional group capable of initiating free radical polymerization. Immobilization of the filter on the surface of the fluid flow path is carried out by a reaction between the functional group on the surface of the fluid flow path and the photopolymerizable monomer or a functional group in the polymerization initiator.

The fluid flow path may be a microchannel or a microchamber. The injecting of the photopolymerization reaction solution may be performed by any known method in the art. For example, a manually operating pipette, or a mechanical injector using air pressure or a piezoelectric element, can be used. An amount of the introduced photopolymerization reaction fluid may vary according to the position or dimension of the filter. The photopolymerization reaction solution is introduced through the photopolymerization reaction solution inlet which is formed at desired locations between from the inlet to the outlet of the fluid flow path. In general, the filter is located with a distance from the inlet of the fluid flow path. The photopolymerization reaction solution inlet can be formed during or after the fabrication of the fluid flow path. In the latter case, the photopolymerization reaction solution inlet may be formed just before forming a porous membrane (i.e., filter) in the fluid flow path, after the fabrication of the fluid flow path. The photopolymerization reaction solution inlet may be formed by a conventional method, for example, by making a microscale hole in a vertical direction from the fluid flow directions with a hot emboser. The location of the photopolymerization reaction solution inlet determines the location of the filter. The thickness of the filter may be adjusted by controlling the amount of the photopolymerization reaction solution introduced into the inlet. The pose size of the filter may be adjusted by the composition of the photopolymerization reaction solution. Therefore, the filter can be formed at desired locations to have a desired pore size in a fluid flow path. Thus, the method according to the present invention may be advantageously employed for microfluidic devices provided with a plurality of microchannels or microchambers.

The photopolymerization reaction solution may contain about 10 to about 100 parts by weight of the crosslinker, about 1 to about 10 parts by weight of the photopolymerization initiator, and about 50 to about 500 parts by weight of the porogen on 100 parts by weight of the photopolymerizable monomer. Amounts of the crosslinker and the porogen may vary according to the reaction time or the size of pores to be introduced to the final filter. For example, in order to reduce a reaction time for a predetermined pore size of a filter, it is necessary to increase concentrations of the crosslinker and the porogen. In order to decrease the pore size while polymerization is carried out for a same period of time, it is necessary to increase a concentration of the crosslinker and decrease a concentration of the porogen. When concentrations of the crosslinker and the porogen are maintained at constant levels, the longer the reaction time is, the smaller the pore size becomes.

The method of the present invention includes exposing the photopolymerization reaction solution to UV radiation to synthesize a porous polymer thereby to form a filter in the fluid flow path in a microfluidic device.

The UV radiation may be, but not limited to, UV light of a wavelength ranging from about 250 nm to about 400 nm. The UV radiation may be applied from either the exterior or the interior of the microfluidic device. Accordingly, the microfluidic device may be made of a material with UV transmittance.

According to the method of the present invention, it is possible to easily form a filter having various pore sizes in various fluid flow paths in the microfluidic device since formation of photopolymerization reaction solution inlet can be made at any location in a fluid flow path, and injection of the photopolymerization reaction solution through the inlet and exposing UV radiation leads to the formation of a filter at a desired location in a desired pore size.

The present invention will now be described in greater detail with reference to the following examples. The following examples are for illustrative purposes only and are not intended to limit the scope of the invention.

EXAMPLE 1

Formation of Filter Having Various Pore Sizes in Fluid Flow Path in Microfluidic CD A filter was formed at a microchannel in a microfluidic CD having a plurality of chambers and microchannels.

(1) CD-Type Microfluidic Device (to be Also Referred to as "Microfluidic CD")

Microchannels, microchambers, inlets, and outlets are fabricated on upper and lower substrates made of transparent PMMA (poly (methylmethacrylate) copolymer) using a CNC (computer numerical control) machine (Sirius 550™, Hwacheon Inc., Korea), and the upper and lower substrates are adhered to each other, thereby manufacturing a microfluidic compact disk (CD). The CNC machine is a tool that is used to mechanically fabricate patterns which are identical with preprogrammed designs. That is, the CNC machine is a tool for micromachining bores, microchannels or microchambers in a predetermined pattern using a precisely controllable device.

The microfluidic CD includes dimensions, including a diameter of about 120 mm, and thicknesses of its upper and lower substrates of about 1 mm and 6 mm, respectively.

A bead packing region in the microfluidic CD has a depth of about 0.2 mm and a width of about 1 mm. A microchannel has a depth of about 1 mm and a width of about 1 mm. A chamber has a depth of about 3 mm.

FIG. 1 illustrates a part of the fabricated microfluidic CD, which is composed of a chamber 10, a microchannel 20, and a fluid inlet 30.

Figure 2:
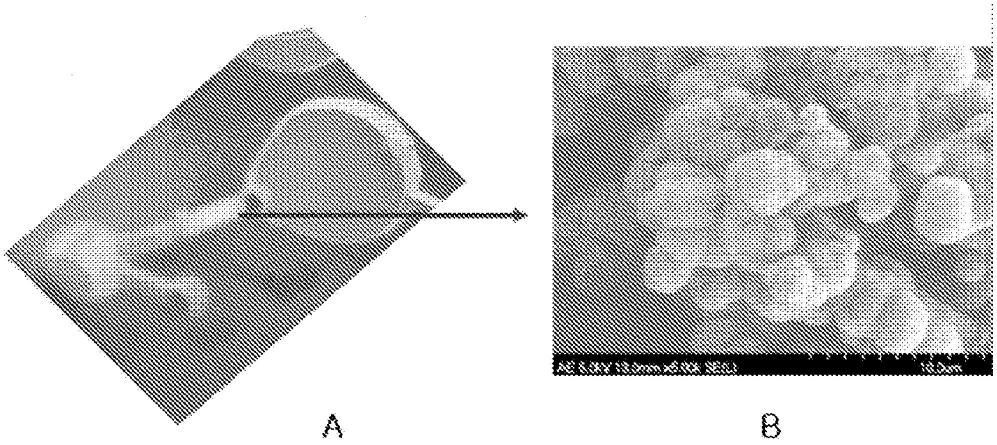
FIGS. 2A and 2B each illustrate a part of a fabricated microfluidic CD, in which FIG. 2A provides a image showing a microchamber and a microchannel and FIG. 2B provides an Scanning Electron Microscope (SEM) image showing a filter formed in the microchannel.

FIG. 2A is a photographic image showing a microchamber and a microchannel FIG. 2B is a Scanning Electron Microscope (SEM) image showing a filter formed in the microchannel according to the process described below (paragraph 34, 2 minutes reaction) at (2) Preparation, Injection and Exposure of Photopolymerization Reaction fluid.

A photopolymerization reaction fluid was prepared by mixing 150 μl (15 volume %) of methyl methacrylate, 100 μl (10 volume %) of trimethylolpropane trimethacrylate (TRIM), 500 μl (50 volume %) of methanol, 250 μl (25 volume %) of n-hexane and dissolving 2,2-dimethoxy-2-phenylacetophenone in the mixture.

7 μl of the photopolymerization reaction fluid was injected into the microfluidic CD prepared in Section (1) through the fluid inlet (see reference numeral "30" of FIG. 1) and UV radiation of i line (365 nm) was externally applied to the microfluidic CD. The exposure time of the UV radiation for microfluidic CD 1, 2, and 3 was 1.5, 2, and 3 minutes, respectively, producing three microfluidic CDs with filters of a different pore size, in the microchannel.

Next, each of the three microfluidic CDs was provided with a fluid containing beads having different diameters of 100 μm, 40 μm, or 3 μm, by injecting the fluid into a different microchamber of the three microfluidic CDs. Pore size of the filters of the each microfluidic CDs was estimated by determining whether beads of each diameter were filtered or not. The microfluidic CDs 1, 2, and 3 were placed into a centrifugal analyzer and centrifuged at 3600 rpm for 20 seconds, 30 seconds, and 40 seconds, respectively.

Retention rates for each of the fluids containing beads of a different size with respect of the filters formed by a polymerization performed for a different reaction time were determined by the following formula:

(Number of beads unfiltered/number of beads added)× 100.

The results are shown in Table 1.

TABLE 1

| | Exposure time | | |
|---|---|---|---|
| Beads sizes | 90 sec. | 120 sec. | 180 sec. |
| 100 μm | 0% | >99% | >99% |
| 40 μm | 0% | >99% | >99% |
| 3 μm | 0% | 54% | >99% |

As shown in Table 1, as the reaction time increased, even very small sized beads could not be passed through the filter. That is to say, as the reaction time increased, the pore size was reduced. Therefore, the pore size of the filter can be controlled by adjusting the reaction time. Alternatively, the pose size can be controlled by varying the composition of the photopolymerization reaction solution.

Accordingly, in a microfluidic device including a plurality of microchannels and microchambers, particularly, a microfluidic device implemented in a CD type, a filter having a desired pore size can be easily formed in each of the plurality of microchannels and microchambers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for forming a filter in a fluid flow path in a microfluidic device comprising:

providing a photopolymerization reaction solution comprising a photopolymerizable monomer, a crosslinker, a photopolymerization initiator, and a porogen;

introducing the photopolymerization reaction solution into the fluid flow path of the microfluidic device; and performing a polymerization reaction of the photopolymerization reaction solution form the filter in the fluid flow path in a microfluidic device, wherein the photopolymerization reaction solution is introduced into the fluid flow path through an inlet formed at a location of the fluid flow path that is not an end of the fluid flow path, and wherein the microfluidic device comprises a first fluid flow path and a second fluid flow path, a first filter is formed in the first fluid flow patch according to the providing, the introducing, and the performing, a second filter is formed in the second fluid flow path according to the providing, the introducing, and the performing, and a pore size of the first filter differs from a pore size of the second filter.

2. The method of claim 1, wherein the polymerization reaction is performed by applying UV radiation to the photopolymerization reaction solution in the fluid flow path.

3. The method of claim 1, wherein the photopolymerizable monomer is a vinyl monomer.

4. The method of claim 3, wherein the vinyl monomer is selected from the group consisting of a C1-C20 alkyl acrylate, a C1-C20 alkyl methacrylate, and a styrene.

5. The method of claim 1, wherein the crosslinker is an aliphatic or an aromatic crosslinker.

6. The method of claim 5, wherein the aliphatic crosslinker is selected from the group consisting of a homopolymer or copolymer of a C1-C20 alkyl acrylate, a C1-C20 alkyl methacrylate and a styrene; an ethylene glycol dimethacrylate; an ethylene glycol diacrylate; a tri-methylol propane diacrylate;

a tri-methylol propane triacrylate; a tri-methylol propane dimethacrylate; a tri-methylol propane trimethacrylate; a divinylketone; an arylacrylate; a diallyl maleate; a diallyl fumarate; a diallyl succinate; a diallyl carbonate; a diallyl malonate; a diallyl oxalate; a diallyl adipate; a diallyl sebacate; a divinyl sebacate; a N,N'-methylenediacrylamide; and a N,N'-methylenedimethacrylamide.

7. The method of claim 5, wherein the aromatic crosslinker is selected from the group consisting of a divinylbenzene, a trivinylbenzene, a divinyltoluene, a divinylnaphthalene, a diallylphthalate, a divinylxylene, and a divinylethylbenzene.

8. The method of claim 1, wherein the initiator is selected from the group consisting of azobisisobutyronitrile (AIBN), 1,1'-azobis(cyclohexanecarbonitrile (ABCN), benzophenone, 2,2-dimethoxy-2-phenylacetophenone, and benzoyl peroxide.

9. The method of claim 1, wherein the porogen is a hydrocarbon having at least 6 carbons or an aliphatic alcohol.

10. The method of claim 1, wherein the fluid flow path is made of a material selected from the group consisting of a metal, silicon, plastic, and a polymer, and comprises a functional group that allows the filter to be bonded to and immobilized on the fluid flow path.

11. The method of claim 1, wherein the fluid flow path is a microchannel or a microchamber.

12. The method of claim 1, wherein the photopolymerization reaction fluid comprises about 10 to about 100 parts by weight of the crosslinker, about 1 to about 10 parts by weight of the photopolymerization initiator, and about 50 to about 500 parts by weight of the porogen on 100 parts by weight of the photopolymerizable monomer.

13. The method of claim 10, wherein the functional group is a vinyl group.

14. The method of claim 2, wherein a pore size of the filter is controlled according to an exposure time of the UV radiation.

15. The method of claim 1, wherein the polymerization initiator comprises a functional group that allows the filter to be bonded to and immobilized on the fluid flow path.

* * * * *